United States Patent
Sugar et al.

(10) Patent No.: US 7,194,237 B2
(45) Date of Patent: *Mar. 20, 2007

(54) SYSTEM AND METHOD FOR MULTIPLE-INPUT MULTIPLE-OUTPUT (MIMO) RADIO COMMUNICATION

(75) Inventors: Gary L. Sugar, Rockville, MD (US); Chandra Vaidyanathan, Bethesda, MD (US)

(73) Assignee: IPR Licensing Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/627,537

(22) Filed: Jul. 25, 2003

(65) Prior Publication Data

US 2004/0023621 A1    Feb. 5, 2004

Related U.S. Application Data

(60) Provisional application No. 60/319,437, filed on Jul. 30, 2002, provisional application No. 60/479,945, filed on Jun. 19, 2003, provisional application No. 60/461,672, filed on Apr. 10, 2003.

(51) Int. Cl.
  *H04B 1/02*   (2006.01)
  *H04M 1/00*   (2006.01)

(52) U.S. Cl. .................. 455/39; 455/101; 455/522; 455/562.1; 375/299

(58) Field of Classification Search .............. 455/59, 455/101, 103, 522, 500, 562.1, 272, 132, 455/70, 517, 506, 69; 375/267, 299, 260, 375/347

See application file for complete search history.

(56) References Cited

U.S. PATENT DOCUMENTS 4,121,221 A    10/1978   Meadows (Continued)

FOREIGN PATENT DOCUMENTS

RU    2107989    3/1998

(Continued)

OTHER PUBLICATIONS

Shtrom, et al., "Designing MIMO Systems for Reliable Coverage in Non-LOS Wireless Links," Oct. 2002, www.rfdesign.com.

(Continued)

*Primary Examiner*—Simon Nguyen
(74) *Attorney, Agent, or Firm*—Volpe and Koenig, P.C.

(57) ABSTRACT

A system, method and device for MIMO radio communication of multiple signals between a first device having N plurality of antennas and a second device having M plurality of antennas. At the first device, a vector s representing L signals $[s_1 \ldots s_L]$ to be transmitted is processed with a transmit matrix A to maximize capacity of the channel between the first device and the second device subject to a power constraint that the power emitted by each of the N antennas is less than or equal to a maximum power. The power constraint for each antenna may be the same for all antennas or specific or different for each antenna. For example, the power constraint for each antenna may be equal to a total maximum power emitted by all of the N antennas combined divided by N. The transmit matrix A distributes the L signals $[s_1 \ldots s_L]$ among the N plurality of antennas for simultaneous transmission to the second device. At the second device, the signals received by the M plurality of antennas are processed with receive weights and the resulting signals are combined to recover the L signals.

15 Claims, 6 Drawing Sheets

U.S. PATENT DOCUMENTS

| | | | |
|---|---|---|---|
| 4,599,734 A | 7/1986 | Yamamoto | |
| 4,639,914 A | 1/1987 | Winters | |
| 5,274,844 A | 12/1993 | Harrison et al. | |
| 5,394,435 A | 2/1995 | Weerackody | 375/206 |
| 5,437,055 A | 7/1995 | Wheatley, III | 455/33.3 |
| 5,457,808 A | 10/1995 | Osawa et al. | |
| 5,491,723 A | 2/1996 | Diepstraten | |
| 5,493,307 A | 2/1996 | Tsujimoto | |
| 5,507,035 A | 4/1996 | Bantz et al. | |
| 5,539,832 A | 7/1996 | Weinstein et al. | |
| 5,570,366 A | 10/1996 | Baker et al. | |
| 5,577,265 A | 11/1996 | Wheatley, III | |
| 5,610,617 A | 3/1997 | Gans et al. | |
| 5,752,173 A | 5/1998 | Tsujimoto | |
| 5,761,193 A | 6/1998 | Derango et al. | |
| 5,761,237 A | 6/1998 | Petersen et al. | |
| 5,812,531 A | 9/1998 | Cheung et al. | |
| 5,848,105 A | 12/1998 | Gardner et al. | |
| 5,898,679 A | 4/1999 | Brederveld et al. | |
| 5,912,921 A | 6/1999 | Warren et al. | |
| 5,930,248 A | 7/1999 | Langlet et al. | |
| 5,982,327 A | 11/1999 | Vook et al. | |
| 6,008,760 A | 12/1999 | Shattil | 342/378 |
| 6,023,625 A | 2/2000 | Myers, Jr. | |
| 6,037,898 A | 3/2000 | Parish et al. | |
| 6,038,272 A | 3/2000 | Golden | |
| 6,044,120 A | 3/2000 | Bar-David et al. | |
| 6,058,105 A * | 5/2000 | Hochwald et al. | 370/310 |
| 6,091,934 A | 7/2000 | Berman et al. | |
| 6,097,771 A | 8/2000 | Foschini | 375/346 |
| 6,118,788 A | 9/2000 | Kermani | |
| 6,122,260 A | 9/2000 | Liu et al. | 370/280 |
| 6,124,824 A | 9/2000 | Xu et al. | |
| 6,141,393 A | 10/2000 | Thomas et al. | 375/347 |
| 6,141,567 A | 10/2000 | Youssefmir et al. | |
| 6,144,651 A | 11/2000 | Rinchiuso et al. | |
| 6,144,711 A | 11/2000 | Raleigh et al. | 375/347 |
| 6,147,985 A | 11/2000 | Bar-David et al. | |
| 6,157,340 A | 12/2000 | Xu et al. | |
| 6,157,843 A | 12/2000 | Derango et al. | |
| 6,177,906 B1 | 1/2001 | Petrus | |
| 6,185,440 B1 | 2/2001 | Barratt et al. | |
| 6,195,045 B1 | 2/2001 | Xu et al. | |
| 6,211,671 B1 | 4/2001 | Shattil | |
| 6,252,548 B1 | 6/2001 | Jeon | 342/383 |
| 6,252,884 B1 | 6/2001 | Hunter | |
| 6,266,528 B1 | 7/2001 | Farzaneh | |
| 6,295,026 B1 | 9/2001 | Chen et al. | |
| 6,298,092 B1 | 10/2001 | Heath, Jr. et al. | 375/267 |
| 6,307,882 B1 | 10/2001 | Marzetta | |
| 6,314,147 B1 | 11/2001 | Liang et al. | |
| 6,317,466 B1 | 11/2001 | Foschini et al. | 375/267 |
| 6,327,310 B1 | 12/2001 | Hochwald et al. | 375/259 |
| 6,331,837 B1 | 12/2001 | Shattil | 342/378 |
| 6,349,219 B1 | 2/2002 | Hochwald et al. | |
| 6,351,499 B1 | 2/2002 | Paulraj et al. | 375/267 |
| 6,362,781 B1 | 3/2002 | Thomas et al. | 342/383 |
| 6,369,758 B1 | 4/2002 | Zhang | |
| 6,370,182 B2 | 4/2002 | Bierly et al. | |
| 6,377,631 B1 * | 4/2002 | Raleigh | 375/299 |
| 6,377,636 B1 | 4/2002 | Paulraj et al. | |
| 6,377,819 B1 | 4/2002 | Gesbert et al. | 455/562 |
| 6,400,699 B1 | 6/2002 | Airy et al. | 370/329 |
| 6,400,780 B1 | 6/2002 | Rashid-Farrokhi et al. | 375/347 |
| 6,442,214 B1 | 8/2002 | Boleskei et al. | 375/299 |
| 6,452,964 B1 * | 9/2002 | Yoshida | 375/222 |
| 6,462,709 B1 | 10/2002 | Choi | |
| 6,463,295 B1 | 10/2002 | Yun | |
| 6,473,467 B1 | 10/2002 | Wallace et al. | 375/267 |
| 6,522,898 B1 | 2/2003 | Kohno et al. | |
| 6,549,786 B2 | 4/2003 | Cheung | |
| 6,570,929 B1 | 5/2003 | Eriksson | |
| 6,584,161 B2 | 6/2003 | Hottinen | |
| 6,636,568 B2 | 10/2003 | Kadous | 375/255 |
| 6,646,600 B2 | 11/2003 | Vail et al. | |
| 6,661,856 B1 * | 12/2003 | Calderbank et al. | 375/347 |
| 6,684,064 B2 | 1/2004 | Kazakevich et al. | |
| 6,687,492 B1 | 2/2004 | Sugar et al. | |
| 6,763,073 B2 * | 7/2004 | Foschini et al. | 375/260 |
| 6,771,706 B2 * | 8/2004 | Ling et al. | 375/267 |
| 6,922,445 B1 * | 7/2005 | Sampath et al. | 375/267 |
| 6,963,619 B1 * | 11/2005 | Gesbert et al. | 375/267 |
| 6,968,013 B2 * | 11/2005 | Awater et al. | 375/262 |
| 2001/0012764 A1 | 8/2001 | Edwards et al. | |
| 2001/0015994 A1 | 8/2001 | Nam | 375/130 |
| 2001/0015999 A1 | 8/2001 | Nam | 375/148 |
| 2001/0046255 A1 | 11/2001 | Shattil | 375/142 |
| 2001/0053143 A1 | 12/2001 | Li et al. | 370/344 |
| 2002/0001316 A1 | 1/2002 | Hornsby et al. | 370/487 |
| 2002/0024975 A1 | 2/2002 | Hendler | |
| 2002/0034191 A1 | 3/2002 | Shattil | |
| 2002/0039884 A1 | 4/2002 | Raynes et al. | 455/13.3 |
| 2002/0064246 A1 | 5/2002 | Kelkar et al. | 375/347 |
| 2002/0067309 A1 | 6/2002 | Baker et al. | 342/367 |
| 2002/0072392 A1 | 6/2002 | Awater et al. | 455/561 |
| 2002/0085643 A1 | 7/2002 | Kitchener et al. | 375/267 |
| 2002/0102950 A1 | 8/2002 | Gore et al. | |
| 2002/0111142 A1 | 8/2002 | Klimovitch | |
| 2002/0118781 A1 | 8/2002 | Thomas et al. | 375/347 |
| 2002/0122383 A1 | 9/2002 | Wu et al. | 370/210 |
| 2002/0122501 A1 | 9/2002 | Awater | 375/262 |
| 2002/0127978 A1 | 9/2002 | Khatri | 455/103 |
| 2002/0136170 A1 | 9/2002 | Struhsaker | 370/280 |
| 2002/0141355 A1 | 10/2002 | Struhsaker et al. | 370/280 |
| 2002/0147032 A1 | 10/2002 | Yoon et al. | |
| 2002/0158801 A1 | 10/2002 | Crilly, Jr. et al. | |
| 2002/0159537 A1 | 10/2002 | Crilly, Jr. | |
| 2002/0172186 A1 | 11/2002 | Larsson | |
| 2002/0172269 A1 | 11/2002 | Xu | |
| 2002/0191535 A1 * | 12/2002 | Sugiyama et al. | 370/208 |
| 2002/0196842 A1 | 12/2002 | Onggosanusi et al. | 375/148 |
| 2003/0002450 A1 | 1/2003 | Jalali et al. | |
| 2003/0003880 A1 | 1/2003 | Ling et al. | |
| 2003/0022693 A1 | 1/2003 | Gerogiokas et al. | |
| 2003/0032423 A1 | 2/2003 | Boros et al. | |
| 2003/0043929 A1 * | 3/2003 | Sampath | 375/267 |
| 2003/0048761 A1 | 3/2003 | Jarett | |
| 2003/0072379 A1 * | 4/2003 | Ketchum | 375/260 |
| 2003/0072382 A1 * | 4/2003 | Raleigh et al. | 375/267 |
| 2003/0108117 A1 | 6/2003 | Ketchum et al. | 375/295 |
| 2003/0114108 A1 | 6/2003 | Frecassetti et al. | |
| 2003/0125040 A1 * | 7/2003 | Walton et al. | 455/454 |
| 2003/0125090 A1 | 7/2003 | Zeira | 455/562 |
| 2003/0130012 A1 | 7/2003 | Brunner et al. | |
| 2003/0139194 A1 | 7/2003 | Onggosanusi et al. | 455/506 |
| 2003/0161282 A1 * | 8/2003 | Medvedev et al. | 370/329 |
| 2003/0162566 A1 | 8/2003 | Shapira et al. | |
| 2003/0165189 A1 | 9/2003 | Kadous | |
| 2003/0181165 A1 | 9/2003 | Sugar et al. | |
| 2003/0181171 A1 | 9/2003 | Sim et al. | |
| 2003/0185309 A1 * | 10/2003 | Pautler et al. | 375/257 |
| 2003/0190897 A1 * | 10/2003 | Lei et al. | 455/101 |
| 2003/0218973 A1 | 11/2003 | Oprea et al. | |
| 2004/0002364 A1 | 1/2004 | Trikkonen et al. | |
| 2004/0013212 A1 * | 1/2004 | Benesty et al. | 375/347 |
| 2004/0023621 A1 | 2/2004 | Sugar et al. | |
| 2004/0095907 A1 * | 5/2004 | Agee et al. | 370/334 |
| 2004/0171385 A1 | 9/2004 | Haustein et al. | |
| 2004/0184398 A1 | 9/2004 | Walton et al. | |
| 2005/0094598 A1 * | 5/2005 | Medvedev et al. | 370/329 |

FOREIGN PATENT DOCUMENTS

| | | |
|---|---|---|
| RU | 2238611 | 10/2004 |

| | | |
|---|---|---|
| RU | 2005/100514 | 6/2005 |
| WO | 01/45300 | 6/2001 |
| WO | 02/03568 | 1/2002 |
| WO | WO02/03568 | 1/2002 |

OTHER PUBLICATIONS

Balaban et al., "Optimum Diversity Combining and Equalization in Digital Data Transmission with Applications to Cellular Mobile Radio-Part II: Numerical Results," IEEE Transactions on Communications, May 1992.

Chuah et al., "Capacity of Multi-Antenna Array Systems in Indoor Wireless Environment," Nov. 1998, IEEE Globecom.

Love et al., "Equal Gain Transmission in Multiple-Input Multiple-Output Wireless Systems," Nov. 2002, Proceedings of IEEE Globecom.

Wolniansky et al., "V-BLAST: An Architecture for Realizing Very High Data Rates Over the Rich-Scattering Wireless Channel," Proceedings of ISSSE-98, Sep. 1998.

Jakes, William C., "Microwave Mobile Communications," IEEE Press, 1974, pp. 313-320, 489-498.

Morgan, Samuel P. "Interaction of Adaptive Arrays in an Arbitrary Environment," The Bell System Technical Journal, Jan. 1965, pp. 23-47.

Yeh, Y.S. "An Analysis of Adaptive Retransmission Arrays in a Fading Environment," The Bell System Technical Journal, Oct. 1970, pp. 1811-1825.

"Lucent Technologies' Chips Poised to Bring "BLAST" Multiple Input/Multiple Output Technology to Laptops, PDAs and Other Mobile Devices," Oct. 16, 2002, Lucent Technologies Press Release.

Yang et al., "On Joint Transmitter and Receiver Optimization for Multiple-Input-Multiple-Output (MIMO) Transmission Systems," Dec. 1994, IEEE Transactions on Communications, vol. 42, No. 12, pp. 3221-3231.

Ivrlac, Michel et al., "On Channel Capacity of Correlated MIMO Channels," ITG Fokusprojekt: Mobilkommunikation "Systeme mit intelligenten Antennen", Ilmenau, 2001.

Meyer-Ottens, Sven et al., "Downlink Beamforming for W-CDMA Using Feedback and Interference Estimate," Mar. 9, 2001.

Iserte, Antonio Pascual et al., "Pre-and Post-Beamforming in MIMO Channels Applied to HIPERLAN/2 and OFDM," IST Summit 2001 (IST Mobile Communications Summit), Sep. 2001.

Lee, Dennis et al., "Antenna Diversity for an OFDM System in a Fading Channel," Proceeding of IEEE MILCOM 1999, Nov. 1999, pp. 1104-1109.

Iserte, Antonio Pascual et al., "Joint Beamforming Strategies in OFDM-MIMO Systems," ICASSP 2002 (IEEE International Conference on Acoustics, Speech and Signal Processing), May 2002.

Raleigh et al., "Spatio-Temporal Coding for Wireless Communication," IEEE Transactions on Communications, vol. 46., No. 3, Mar. 1998, pp. 357-366.

Jungnickel et al., "A MIMO WLAN Based on Linear Channel Inversion," IEEE Seminar-MIMO Communication Systems from Concept to Implementation, Dec. 2001, pp. 20/1-20/6.

Junqiang et al., "Spatial Multiuser Access with MIMO Smart Antennas for OFDM Systems," IEEE VTC 2001, Sep. 2001, pp. 1553-1557.

Golden et al., "V-BLAST: A High Capacity Space-Time Architecture for the Rich-Scattering Wireless Channel," Bell Laboratories, Lucent Technologies, Proc. Int'l Symposium on Advanced Radio Technologies, Sep. 10, 1998.

Golden et al., "Detection Algorithm and Initial Laboratory Results Using V-BLAST space-time communication architecture," Electronic Letters, Jan. 7, 1999, vol. 35, No. 1.

BLAST High-Level Overview, Lucent Technologies, Jul. 18, 2000.

Aziz et al., "Indoor Throughput and Range Improvements Using Standard Complaint AP Antenna Diversity in IEEE 802.11a and ETSI HIPERLAN/2", Vehicular Technology Conference, 2002, VTC 2001, Oct. 7-11, 2001, IEEE VTS 54th, vol. 4, pp. 2294-2298.

Bablan et al., "Optimum Diversity Combining and Equalization in Digital Data Transmission with Applications to Cellular Mobile Radio-Part II: Numerical Results"; May 1992; IEEE Transactions on Communications, vol. 30, No. 5; pp. 895-907.

"BLAST High-Level Overview", Lucent Technologies, Jul. 18, 2000.

Briesemeister et al., "Role-Based Multicast in Highly Mobile but Sparsely Connect Ad-Hoc Networks"; First Annual Workshop on Mobile Ad Hoc Networking & Computing; pp. 45-50; Aug. 2000.

Brunner et al., "Downlink Beamforming for WCDMA Based on Uplink Channel Parameters"; Proceedings of 3rd European Personal Mobile Conference (EPMCC '99), Mar. 1999, pp. 375-380.

Chiu et al., "OFDM Receiver Design", EE225C, Fall 2000, University of California, Berkeley.

Chizhik et al., "Keyholes, Correlations, and Capacities of Multielement Transmit and Receiver Antennas", IEEE Transactions on Wireless Communications, vol. 1, No. 2, Apr. 2002, pp. 361-368.

Choi et al., "MISO CDMA Transmission with Simplified Receiver for Wireless Communication Handsets", IEEE Transactions on Communications, vol. 49, No. 5, May 2002.

Golden et al., "Detection Algorithm and Initial Laboratory Results Using V-BLAST Space-Time Communication Architecture", Electronic Letters, Jan. 7, 1999, vol. 35, No. 1.

Golden et al., "V-BLAST: A High Capacity Space-Time Architecture for the Rich-Scattering Wireless Channel", Bell Laboratories, Lucent Technologies, Proc. Int'l Symposium on Advanced Radio Technologies, Boulder, CO, Sep. 10, 1998.

Heath et al., "A Simple Scheme for Transmit Diversity Using Partial Channel Feedback", Signals, Systems & Computers, Conference Record of the Thirty-Second Asilomar Conference, Nov. 1-4, 1998; vol. 2; pp. 1073-1078.

Irmer et al., "MISO Concepts for Frequency-Selective Channels", 2002 International Zurich Seminar on Broadband Communications Access, Feb. 19-21, 2002.

Iserte et al., "Iterative Algorithm for the Estimation of Distributed Sources Localization Parameters", SSP 2001, 11th IEEE Workshop on Statistical Signal Processing, Aug. 2001.

Iserte et al., "Joint Beamforming Strategies in OFDM-MIMO Systems", ICASSP 2002, IEEE International Conference on Acoustics, Speech and Signal Processing, May 2002.

Iserte et al., "Pre-and Post-Beamforming in MIMO Channels Applied to HIPERLAN/2 and OFDM", IST Summit 2001, IST Mobile Communications Summit, Sep. 2001.

Ivrlac et al., "On Channel Capacity of Correlated MIMO Channels", ITG Fokusprojekt: Mobilkommunikation "Systeme mit Intelligenten Antennen", Ilmenau, 2001.

Jakes, "Microwave Mobile Communications", Copyright 1974, pp. 313-320 and pp. 489-498.

Jungnickel et al., "A MIMO WLAN Based on Linear Channel Inversion", IEE Seminar-MIMO Communication Systems from Concept TO Implementation, Dec. 2001, pp. 20/1-20/6.

Jungnickel et al., "Performance of a MIMO System with Overlay Pilots", IEEE GlobeCom 2001, pp. 594-598.

Lee et al., "Antenna Diversity for an OFDM System in a Fading Channel", Proceeding of IEEE MILCOM 1999, Nov. 1999, pp. 1104-1109.

Love et al.; "Equal Gain Transmission in Multiple-Input Multiple-Output Wireless Systems", Nov. 2002, Proceedings of IEEE Globecom, pp. 1124-1128.

"Lucent's 'BLAST' Chips to Take Off in Wireless Market", EETimes.com, Oct. 16, 2002.

Lucent Technologies, "Lucent Technologies: Chips Poised to Bring 'BLAST' Multiple Input/Multiple Output Technology to Laptops, PDAs and Other Mobile Devices", Oct. 16, 2002, lucent.com.

Meyer-Ottens, et al. "Downlink Beamforming for W-CDMA Using Feedback and Interference Estimate", Mar. 9, 2001.

Morgan, "Interaction of Adaptive Antenna Arrays in an Arbitrary Environment", The Bell System Technical Journal, Jan. 1965, pp. 23-47.

Raleigh et al., "Spatio-Temporal Coding for Wireless Communication", IEEE Transactions on Communications, vol. 46, No. 3, Mar. 1998, pp. 357-366.

Sanchez et al., "CSMA/CA Beam Forming Antennas in Multi-hop Packet Radio"; Proc. For Swedish Workshop on Wireless Ad-Hoc Networks, Mar. 5-6, 2001.

Stridh et al., "MIMO Channel Capacity on a Measured Indoor Radio Channel at 5.8 GHz", Proc. of the Asilomar Conf. on Signals, Systems & Computers, vol. 1, Oct. 2000, pp. 733-737.

Stridh et al., "Spatial Characterization of Indoor Radio Channel Measurements at 5 GHz", SAM 2000, Mar. 2000, pp. 58-62.

Shtrom et al., "Designing MIMO Systems for Reliable Coverage in Non-LOS Wireless Links", Oct. 2000, www.rfdesign.com.

Vaidyanathan et al., "The Role In Lossless Systems in Modern Digital Signal Processing: A Tutorial", IEEE Transactions on Education, vol. 32, Aug. 1989, pp. 181-197.

Wallace et al., "Experimental Characterization of the MIMO Wireless Channel: Data Acquisition and Analysis", Feb. 27, 2002, Department of Electrical and Computer Engineering, Brigham Young University.

Wolniansky et al., "V-BLAST: An Architecture for Realizing Very High Data Rates Over the Rich-Scattering Wireless Channel", Proc. ISSSE-98, Pisa, Italy, Sep. 29, 1998.

Yang et al., "On Joint Transmitter and Receive Optimization for Multiple-Input-Multiple-Output (MIMO) Transmission Systems", IEEE Transactions on Communications, vol. 42, No. 12, Dec. 1994.

Yeh, "An Analysis of Adaptive Retransmission Arrays in a Fading Environment", The Bell System Technical Journal, Oct. 1970, pp. 1811-1825.

* cited by examiner

SYSTEM AND METHOD FOR MULTIPLE-INPUT MULTIPLE-OUTPUT (MIMO) RADIO COMMUNICATION

This application claims priority to U.S. Provisional Application No. 60/319,437, filed Jul. 30, 2002, to U.S. Provisional Application No. 60/461,672, filed Apr. 10, 2003, and to U.S. Provisional Application No. 60/479,945, filed Jun. 19, 2003. The entirety of each of these applications is incorporated herein by reference.

BACKGROUND OF THE INVENTION

The present invention is directed to a system and method to maximize capacity and/or range of a wireless radio communication link between two radio communication devices.

Multiple-input multiple-output (MIMO) radio communication techniques are known to enhance the received SNR for signals transmitted by one device to another. Research in MIMO radio algorithms has been conducted in which multiple signal streams are transmitted simultaneously from multiple antennas at one device to another device, thereby greatly enhancing the data rate of the wireless radio channel between two devices. One prior approach for transmitting multiple signals streams simultaneously by a plurality of antennas uses a power constraint on the total power transmitted by the plurality of antennas combined and a waterfilling solution. The waterfilling solution requires multiple full-power power amplifiers at the transmitting device since, for some channels, it is possible that all or nearly all the transmit power may be transmitted from one power amplifier. There is room for improving the design of devices capable of MIMO radio communication, particularly where it is desirable to fabricate the radio transceiver of the device in an integrated circuit.

SUMMARY OF THE INVENTION

Briefly, a system, method and device are provided for simultaneous radio communication of multiple signals (signal streams) between a first device having N plurality of antennas and a second device having M plurality of antennas. Unlike prior approaches, the approach taken herein is to impose a power constraint on each transmit antenna path at the transmitting device.

At the first device, a vector s representing L plurality of signals [$s_1 \ldots s_L$] to be transmitted are processed with a transmit matrix A to maximize capacity of the channel between the first device and the second device subject to a power constraint that the power emitted by each of the N antennas is less than or equal to a maximum power. The power constraint for each antenna may be the same for all antennas or specific or different for each antenna. For example, the power constraint for each antenna may be equal to a total maximum power emitted by all of the N antennas combined divided by N. The transmit matrix A distributes the L plurality of signals [$s_1 \ldots s_L$] among the N plurality of antennas for simultaneous transmission to the second device. At the second device, the signals received by the M plurality of antennas are processed with receive weights and the resulting signals are combined to recover the L plurality of signals. Solutions are provided for the cases when N>M and when N≦M.

The performance of a system in which the communication devices are designed around a power constraint at each antenna is nearly as good as the optimal waterfilling solution, yet provides significant implementation advantages. The radio transmitter can be implemented with power amplifiers that require lower power output capability, and thus less silicon area. Consequently, there is lower DC current drain by the transmitter, and lower on-chip interference caused by the power amplifiers.

The above and other objects and advantages will become more readily apparent when reference is made to the following description taken in conjunction with the accompanying drawings.

DETAILED DESCRIPTION OF THE DRAWINGS

Figure 1:
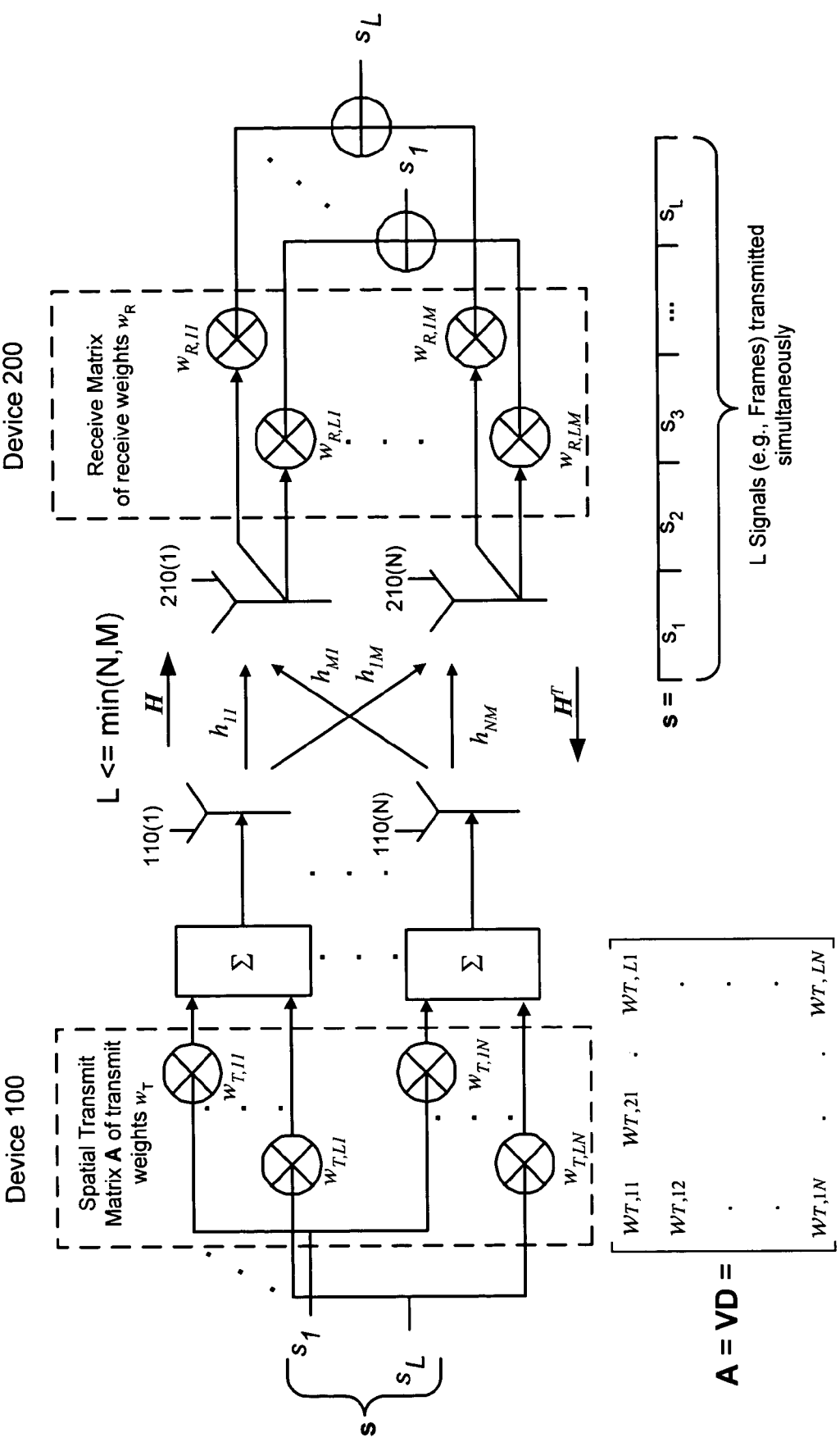
FIG. 1 is a system diagram showing two multiple-antenna radio communication devices, where multiple signal streams are simultaneously transmitted from a first device to a second device.
Figure 2:
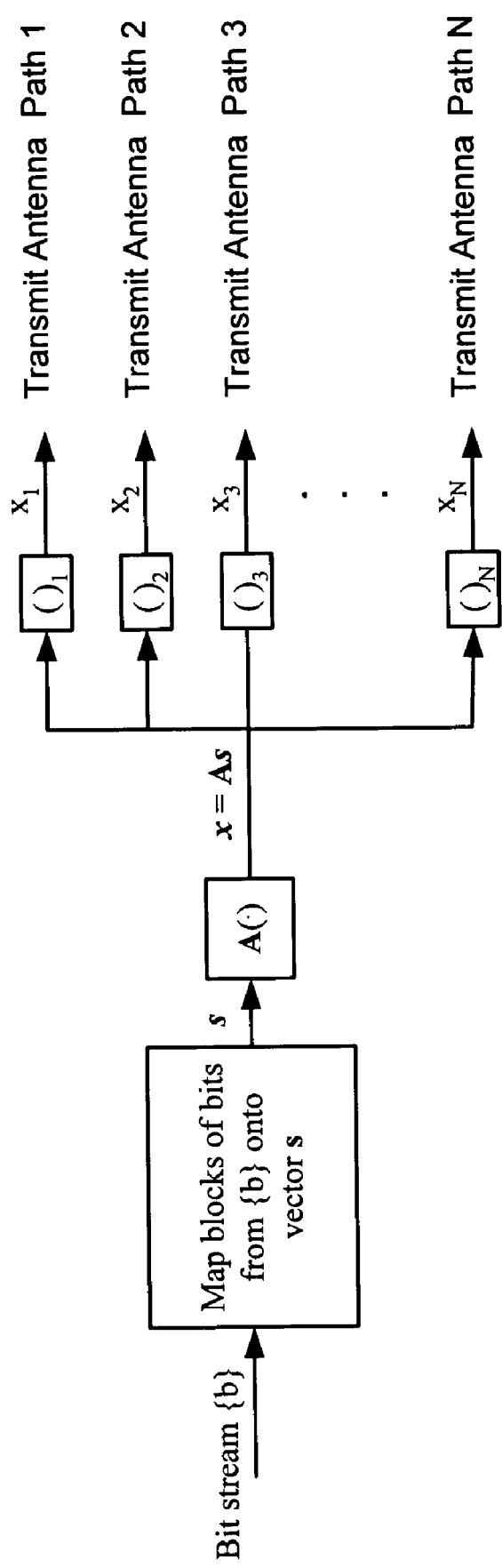
FIG. 2 is a flow chart depicting the mapping and multiplexing of signals to multiple antenna paths for simultaneous transmission.

Referring to FIGS. 1 and 2, a system 10 is shown in which a first radio communication device 100 having N antennas 110(1) to 110(N) communicates by a wireless radio link with a second communication device 200 having M antennas 210(1) to 210(M). In the explanation that follows, the first communication device transmits to the second communication device, but the same analysis applies to a transmission from the second communication device to the first. The multiple-input multiple-output (MIMO) channel response from the N antennas of the first communication device to the M antennas of the second communication device is described by the channel response matrix H. The channel matrix in the opposite direction is $H^T$.

Device 100 will simultaneously transmit L plurality of signals $s_1, s_2, \ldots, s_L$ by antennas 110(1) to 110(N). A vector s is defined that represents the L plurality of signals [$s_1 \ldots s_L$] (at baseband) to be transmitted such that $s=[s_1 \ldots s_L]^T$. The number (L) of signals that can be simultaneously transmitted depends on the channel H between device 100 and device 200, and in particular L≦Rank of $H^H H$≦min(N, M). For example, if N=4, and M=2, then L≦Rank of $H^H H$≦2.

The device 100 has knowledge of the channel state (e.g., using training sequences, feedback, etc.), i.e., device 100 knows H. Techniques to obtain and update knowledge of the channel H at the transmitting device (between the transmitting device and a receiving device) are known in the art and therefore are not described herein. For example, training and feedback techniques are described in U.S. Pat. No. 6,144,711 to Raleigh et al.

Two matrices are introduced: V is the eigenvector matrix for $H^H H$ and $\Lambda$ is the eigenvalue matrix for $H^H H$. Device 100 transmits the product As, where the matrix A is the spatial multiplexing transmit matrix, where A=VD. The matrix D=diag($d_1, \ldots, d_L$) where $|d_p|^2$ is the transmit power in $p^{th}$ mode, or in other words, the power of the $p^{th}$ one of the L signals where p=1 to L. Device 200 receives HAs+n, and after maximal ratio combining for each of the modes, device 200 computes $c=A^H H^H HAs + A^H H^H n = D^H D\Lambda s + D^H V^H H^H n$.

As shown in FIG. 2, at the first device 100, blocks of bits from a bit stream {b} are mapped onto a vector s with a mapping technique. The mapping technique may optionally include coded modulation to improve link margin. The bit stream {b} may be a file or collection of bits, representing any type of data, such as voice, video, audio, computer data, etc., that is divided or otherwise separated into discrete frames or blocks (generally referred to as signals) to be spatially multiplexed and simultaneously transmitted. One example is the simultaneous transmission of multiple IEEE 802.11×frames (each $s_i$ may be a different frame) from the first device 100 to the second device 200, where, for example, the first device 100 is an IEEE 802.11 access point (AP) and the second device is a client station (STA). The product of the transmit matrix A and the vector s is a vector x. This matrix multiplication step effectively weights each element of the vector s across each of the N antennas, thereby distributing the plurality of signals among the plurality of antennas for simultaneous transmission. Components $x_1$ through $x_N$ of the vector x resulting from the matrix multiplication block are then coupled to a corresponding antenna of the first communication device. For example, component $x_1$ is the sum of all of the weighted elements of the vector s for antenna 1, component $x_2$ is the sum of all of the weighted elements of the vector s for antenna 2, etc.

The transmit matrix A is a complex matrix comprised of transmit weights $w_{T,ij}$, for i=1 to L and j=1 to N. Each antenna weight may depend on frequency to account for a frequency-dependent channel H. For example, for a multi-carrier modulation system, such as an orthogonal frequency division multiplexed (OFDM) system, there is a matrix A for each sub-carrier frequency k. In other words, each transmit weight $w_{T,ij}$ is a function of sub-carrier frequency k. For a time-domain (single-carrier) modulation system, each transmit weight $w_{T,ij}$ may be a tapped-delay line filter.

Prior approaches involve selecting the weights $d_p$ to maximize capacity $$C = \sum_{p=1}^{L} \log(1 + SNR_p), SNR_p = |d_p|^2 \lambda_p \frac{E(|s_p|^2)}{E(|n_p|^2)}$$

subject to a total power constraint emitted by the plurality of transmit antennas combined on the transmit matrix A, i.e., $$P_{TOT} = Tr(AA^H) \cdot E|s_p|^2 = Tr(VDD^H V^H) \cdot E|s_p|^2$$
$$= Tr(VDD^H V^H) < P_{\max} (\text{assuming } E|s_p|^2 = 1)$$

The optimum solution to this problem is to use waterfilling to select the weights $d_p$ (i.e., use waterfilling to put more power in eigenchannels with higher SNR $\lambda_p$).

The waterfilling approach requires N full-power capable power amplifiers at the transmitting device since, for some channels, it is possible for the optimal solution to require all or nearly all the transmit power to be sent from one antenna path. To reiterate, the prior approaches constrain the total power emitted from all of the antenna paths combined, simply $\Sigma P_i = P_{TOT} < P_{max}$ (for i=1 to N antennas) where $P_{max}$ is a total power constraint and $P_i$ is the power from transmit antenna path i.

A better approach is to use a power constraint for each individual transmit antenna path. One such constraint is that the power transmitted from each antenna is less than the total power transmitted from all N antennas combined ($P_{max}$) divided by N, e.g., $P_i \leq P_{max}/N$ for all i. Using this approach, referred to as the "antenna power constraint" approach, each power amplifier can be designed to output (no more than) $P_{max}/N$ average power, where $P_{max}$ is the maximum power of the transmission from all of the N antennas combined. A significant benefit of this approach is that the power amplifiers can be designed to have lower maximum output power capability, thus requiring less silicon area. The use of smaller and lower-output power amplifiers has the benefit of lower on-chip power amplifier interference and lower DC current drain.

Using a $P_{max}/N$ power constraint for each antenna, the problem becomes:

Maximize capacity C subject to $$(AA^H)_{ii} < P_{max}/N, i=1, \ldots, N.$$

This is a difficult problem to solve for $d_p$, since it involves finding the roots of a non-linear function using N Lagrange multipliers (one for each of the above N constraints). However, there is a simple non-optimal solution for each of two cases.

Case 1: N≦M:

In this case, the transmitting device (having N plurality of antennas) multiplies the vector s representing the L signals $[s_1 \ldots s_L]^T$ to be transmitted with the transmit matrix A (i.e., computes As), where the transmit matrix A is computed with D set equal to $I \cdot sqrt(P_{max}/N)$ (where I is the identity matrix) enforcing equal power in each mode. As a result, $H^H H$ is Hermitian and (with probability 1) is full-rank, which means that V is orthonormal. Consequently, $(AA^H)_{ii} = (VDD^H V^H)_{ii} = (VV^H)_{ii} P_{max}/N = P_{max}/N$, which means that equal power $P_{max}/N$ is transmitted at each antenna by a corresponding power amplifier of device 100, and the total transmit power is equal to $P_{max}$.

Case 2: N>M:

In this case, $H^H H$ is not full-rank. Let $v_1, \ldots, v_L$ denote the L eigenvectors for $H^H H$ having nonzero eigenvalues. Let $V=[v_1 \ldots v_L]$, and let $D = sqrt(d \cdot P_{max}/N) \cdot I$, where the power for each mode is the same and $d_p = d$ for p=1 to L. The power in antenna path i is given by $(d \cdot P_{max}/N) \cdot (VV^H)_{ii}$. Thus, the power emitted from each of the i antenna paths may be different. The transmitting device (having the N antennas) multiplies the vector s representing the L signals $[s_1 \ldots s_L]^T$ to be transmitted with the transmit matrix A (i.e., computes As), where the transmit matrix A is computed with D set equal to $sqrt(d \cdot P_{max}/N) \cdot I$, where the power for each mode is the same and $d_p = d$ for p=1 to L.

Approach 1: Set d=1/z, where $$z = \max_i \{(VV^H)_{ii}\}.$$

Then the maximum power from any antenna path is $P_{max}/N$. The total power from all antenna paths can be shown to be at least $P_{max}/M$ and no greater than $P_{max}$.

Approach 2: Set d=1. In this case, the total power emitted by the N plurality of antennas is $P_{max}/M$ and the power emitted by antenna i for i=1 to N is $(P_{max}/N) \cdot (VV^H)_{ii}$.

Assuming the power amplifiers at devices on both sides of the link have the same peak output power, then for Case 1 and Case 2/Approach 2, the total power transmitted from the N antenna device will be equal to the total power transmitted from the M antenna device. Hence, the link between the two devices is symmetric in these situations. Case 2/Approach 1 is slightly more complicated (since it requires a normalization step) but has more transmitted power than Approach 2.

The solutions described above are capable of performing within 1 dB of the Shannon limit for a symmetric system (same number of antennas on both sides of the link), but facilitate use of smaller and more efficient power amplifiers in the radio transceiver, and as a result, achieve lower on-chip interference between radio paths (caused by the power amplifiers) than the waterfilling solution.

The antenna power constraint need not be the same for each of the transmit antennas and may be specific to or different for each antenna. Moreover, even if a different antenna power constraint is used for each antenna, each of the antenna-specific power constraints may be less than or equal to $P_{max}/N$.

The device 200 with M plurality of antennas will transmit to device 100 subject to the same type of power constraint at each of the M plurality of antennas. The cases described above are applied where M is compared relative to N, and the appropriate solution is used for transmitting signals to device 100.

Figure 3:
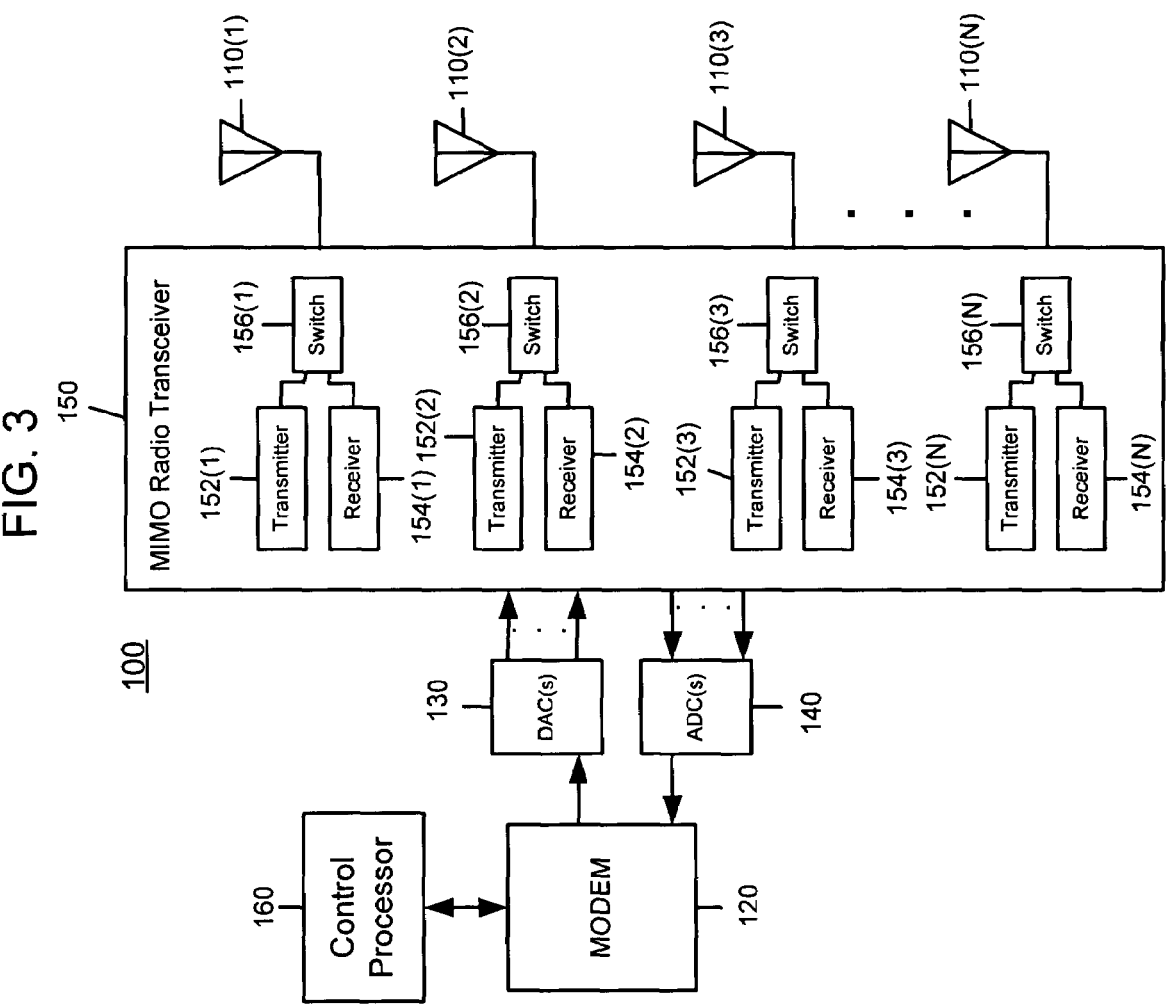
FIG. 3 is a block diagram of a radio communication device capable of performing the MIMO radio communication techniques shown in FIG. 1.

FIG. 3 shows a block diagram of a radio communication device suitable for devices 100 and 200. Device 100 comprises a modem 120, a plurality of digital-to-analog converters (DACs) 130, a plurality of analog-to-digital converters (ADCs) 140, a MIMO radio transceiver 150 coupled to antennas 110(1) to 110(N) and a control processor 160. The modem 120, also referred to as a baseband signal processor, performs the baseband modulation of signals to be transmitted (vector s) and the baseband demodulation of received signals. In so doing, the modem 120 multiplies the vector s representing the L signals $[s_1 \ldots s_L]^T$ to be transmitted by the transmit matrix A. The DACs 130 are complex DACs that convert the digital baseband modulated signals representing As to corresponding analog signals coupled to transmit paths in the MIMO radio transceiver 150. The ADCs 140 convert the received analog signals from corresponding receive paths in the MIMO radio transceiver 150 to digital signals for baseband demodulation by the modem 120. In the baseband demodulation process, the modem 120 will apply appropriate receive weights to the received signals to recover the L signals $[s_1 \ldots s_L]^T$. The MIMO radio transceiver 150 comprises a plurality of radio transceivers each comprising a transmitter 152(i) and a receiver 154(i) associated with and coupled to a corresponding antenna by a corresponding switch 156(i). Each transmitter includes a power amplifier (not shown). The MIMO radio transceiver 150 may be a single integrated circuit or two or more separate integrated circuits. An example of a single-integrated MIMO radio transceiver is disclosed in co-pending and commonly assigned U.S. patent application Ser. No. 10/065,388, filed Oct. 11, 2002, the entirety of which is incorporated herein by reference.

Figure 4:
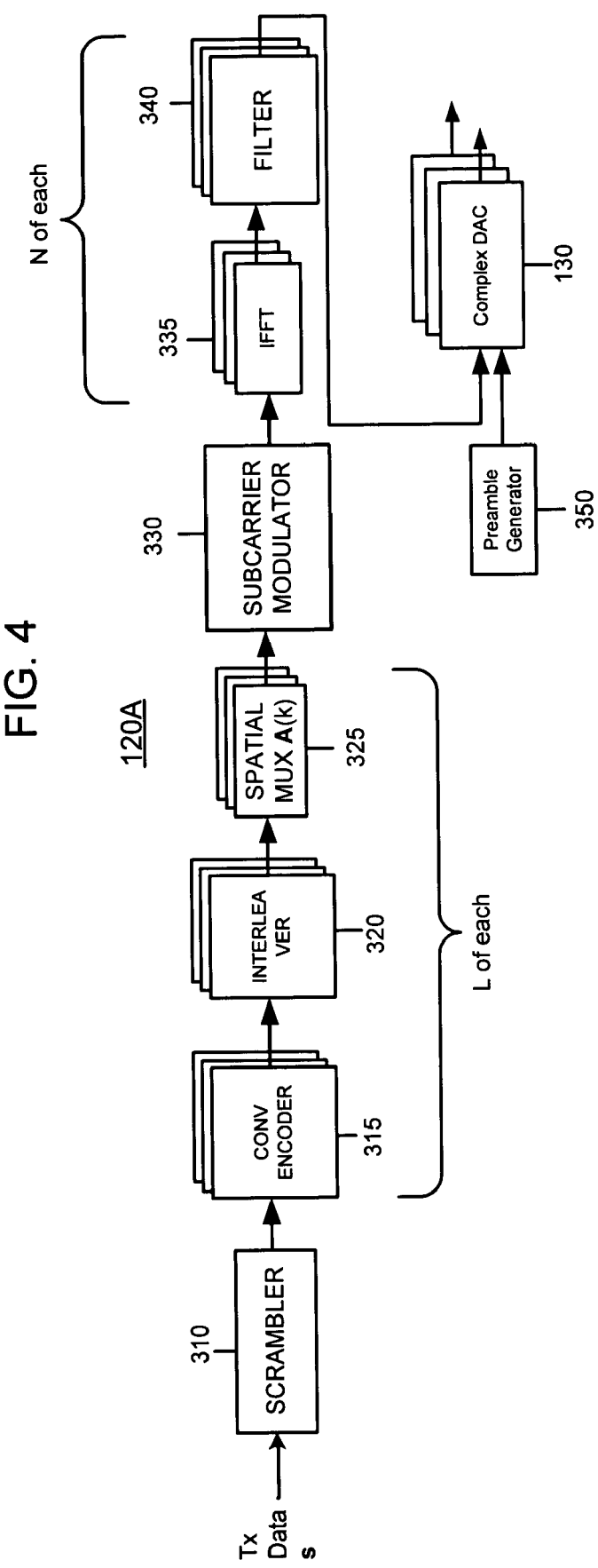
FIG. 4 is a block diagram of an exemplary transmitter section of a modem forming part of the device shown in FIG. 3.
Figure 5:
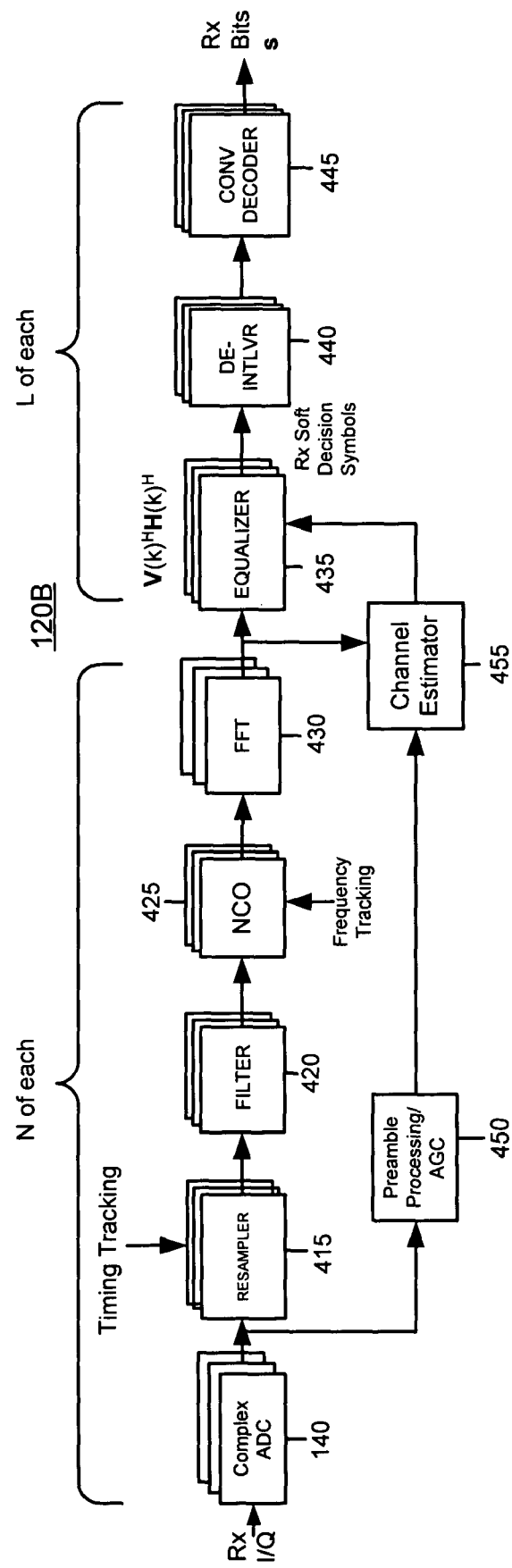
FIG. 5 is a block diagram of an exemplary receiver section of the modem.

There are many ways to implement the modem 120. FIGS. 4 and 5 show block diagrams of examples of the transmitter section 120A and receiver sections 120B, respectively, of the modem 120, for a multi-carrier, e.g., orthogonal frequency division multiplexed (OFDM) application. Generally, matrix multiplication of the type described above is performed independently on each OFDM subcarrier to optimize performance for indoor frequency-selective fading channels. With reference to FIG. 4, the transmitter section 120A of the modem comprises a scrambler block 310, a block 315 of convolutional encoders, a block 320 of interleavers, a spatial multiplexer block 325 that performs the matrix multiplication with the transmit matrix A that is different at each of the OFDM sub-carriers k (i.e., A=A(k)), a subcarrier modulator 330, a block 335 of inverse Fast Fourier Transforms (IFFTs) and a block 340 of low pass filters. The output of the low pass filters block 340 is coupled to the DACs 130 (FIG. 3). A preamble generator 350 is also provided and is coupled to the DACs 130. As shown in FIG. 4, assuming the modem is in an N antenna device, there are L instances of blocks 315, 320 and 325 to perform processing on each baseband transmit signal stream and N instances of blocks 335, 340 and 130 for processing signals associated with each transmit antenna path.

The receiver section 120B shown in FIG. 5 comprises a block 415 of resamplers, a block of lowpass filters 420, a block 425 of numerically controlled oscillators (NCOs), a block 430 of FFTs, a block of equalizers 435 in which the receive weights are applied to the receive signals, a block of de-interleavers 440 and a block of convolutional decoders 445. A preamble processing and automatic gain control (AGC) block 450 and a channel estimator block 455 are also provided for channel estimation computations and other functions. The preamble and AGC block 450 recovers a preamble in the received signal and the channel estimator 455 generates knowledge about the channel H, which knowledge is supplied to the equalizer 435 to compute and apply receive weights to the signals output by the FFT block 430. Assuming the modem is in an N antenna device, there are N instances of blocks 415, 420, 425 and 430 to perform processing on each received signal stream and L instances of blocks 435, 440 and 445 to recover the L signals.

As suggested in the description above of FIGS. 4 and 5, a first device passes channel response information to a second device by sending a known OFDM training sequence once through each antenna in, for example, a packet preamble. For a frequency domain implementation, the second device performs a space-frequency decomposition (SFD) given this channel information, and uses the SFD data to process received signals from that device, and to transmit signals back to the other device. This assumes reciprocity in the link, and therefore MIMO phase calibration at each device needs to be performed. Techniques for MIMO phase calibration are disclosed in commonly assigned and co-pending U.S. patent application Ser. No. 10/457,293, filed Jun. 9, 2003, the entirety of which is incorporated herein by reference. Information regarding constellation order as a function of subcarrier index and eigenchannel may also be included in preamble. Each subcarrier has an associated constellation order for each eigenchannel. In the transmitter section 120A, a multi-dimensional vector trellis encoder (VTE) may be used to map input bits from the scrambler onto OFDM constellation symbols. Examples of multi-dimensional VTE's are known in the art. Other techniques for obtaining channel state information are known in the art as suggested above.

A modem may be built that applies the power constraint principles described above to a time-domain system implementation where tapped delay-line filters are used.

Figure 6:
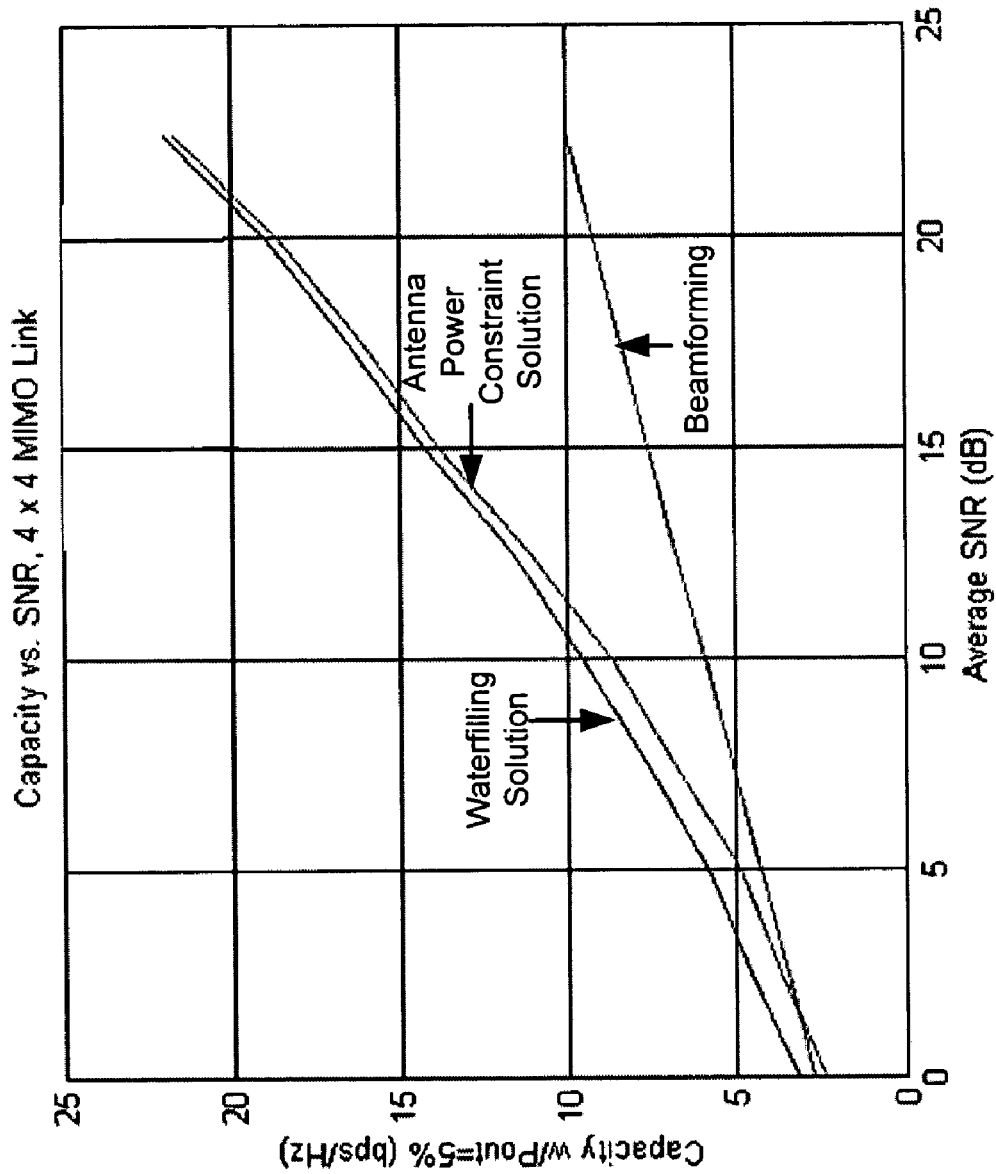
FIG. 6 is a graphical plot that illustrates the relative performance of the MIMO radio techniques described herein.

FIG. 6 illustrates how the more efficient antenna power constraint described herein compares to the optimal waterfilling approach.

In sum, a system and method are provided for MIMO radio communication between a first device having N plurality of antennas and a second device having M plurality of antennas. At the first device, a vector s representing L signals [$s_1 \ldots s_L$] to be transmitted is processed with a transmit matrix A to maximize capacity of the channel between the first device and the second device subject to a power constraint that the power emitted by each of the N antennas is less than a maximum power, whereby the transmit matrix A distributes the L signals [$s_1 \ldots s_L$] among the N plurality of antennas for simultaneous transmission to the second device. Similarly, a radio communication device is provided comprising N plurality of antennas, N plurality of radio transmitters each coupled to a corresponding one of the plurality of antennas, and a baseband signal processor coupled to the N plurality of radio transmitters to process a vector s representing L signals [$s_1 \ldots s_L$] to be transmitted with a transmit matrix A to maximize capacity of the channel between the first device and the second device subject to a power constraint that the power emitted by each of the N antennas is less than a maximum power, whereby the transmit matrix A distributes the L signals [$s_1 \ldots s_L$] for simultaneous transmission to the second device by the N plurality of antennas. The transmit matrix A is computed subject to the power constraint being different for one or more of the N antennas or being the same for each of the N plurality of antennas. For example, in the latter case, the transmit matrix A may be computed subject to the power constraint for each of the N plurality of antennas being equal to a total maximum power emitted by all of the N plurality of antennas combined divided by N.

The above description is intended by way of example only.

What is claimed is:

1. A method of simultaneously transmitting signals over a channel between a first device having N plurality of antennas and a second device having M plurality of antennas, the method comprising:

processing a vector s representing L signals [$s_1 \ldots s_L$] with a transmit matrix A that is computed to maximize capacity of the channel by multiplying the vector s with the transmit matrix A, wherein the transmit matrix A is equal to VD, where V is an eigenvector matrix for $H^H H$, H is the channel response from the first device to the second device, $D=\text{diag}(d_1, \ldots, d_L)$ and $|d_p|^2$ is the transmit power for p=1 to L; and transmitting with a power constraint for each individual transmit antenna path, wherein if $N \leq M$, then $D=I \cdot \text{sqrt}(P_{max}/N)$, with I as an identity matrix, such that the power transmitted by each of the N plurality of antennas is the same and equal to $P_{max}/N$; and if N>M, then $D=\text{sqrt}(d \cdot P_{max}/N) \cdot I$, such that the power transmitted by antenna i for i=1 to N is $(d \cdot P_{max}/N) \cdot (VV^H)_{ii}$, and $d_p = d$ for p=1 to L.

2. The method of claim 1, wherein the transmit matrix A is computed subject to the power constraint.

3. The method of claim 1, wherein if N>M, then d=1/z and $$z = \max_i \{(VV^H)_{ii}\},$$

such that the maximum power from any of the N plurality of antennas is $P_{max}/N$ and the total power emitted from the N plurality of antennas combined is between $P_{max}/M$ and $P_{max}$.

4. The method of claim 1, wherein if N>M, then d=1, such that the power emitted by antenna i for i=1 to N is $(P_{max}/N) \cdot (VV^H)_{ii}$, and the total power emitted from the N plurality of antennas combined is $P_{max}/M$.

5. The method of claim 1, and further comprising:

receiving at the M plurality of antennas signals transmitted by the first device; and processing the signals received at each of the plurality of M antennas with receive weights and combining the resulting signals to recover the L signals.

6. The method of claim 1, wherein each of the L signals is baseband modulated using a multi-carrier modulation process, and wherein the processing comprises multiplying the vector s with a transmit matrix A(k) at each of a plurality of sub-carriers k.

7. A radio communication device for simultaneously transmitting signals over a channel between N transmit antennas and M receive antennas, the radio communication device comprising:

a. N plurality of antennas;

b. N plurality of radio transmitters each coupled to a corresponding one of the plurality of antennas; and c. a baseband signal processor coupled to the N plurality of radio transmitters to process a vector s representing L signals [$s_1 \ldots s_L$] with a transmit matrix A that is computed to maximize capacity of the channel by multiplying the vector s with the transmit matrix A, wherein the transmit matrix A is equal to VD, where V is an eigenvector matrix for $H^H H$, H is the channel response from the first device to the second device, $D=\text{diag}(d_1, \ldots, d_L)$ and $|d_p|^2$ is the transmit power for p=1 to L; and to transmit according to a power constraint for each individual transmit antenna path, wherein if $N \leq M$, then $D=I \cdot \text{sqrt}(P_{max}/N)$, with I as an identity matrix, such that the power transmitted by each of the N plurality of antennas is the same and equal to $P_{max}/N$; and if N>M, then $D=\text{sqrt}(d \cdot P_{max}/N) \cdot I$, such that the power transmitted by antenna i for i=1 to N is $(d \cdot P_{max}/N) \cdot (VV^H)_{ii}$, and $d_p = d$ for p=1 to L.

8. The device of claim 7, wherein the transmit matrix A is computed subject to the power constraint.

9. The device of claim 7, wherein if N>M, then d=1/z and $$z = \max_i \{(VV^H)_{ii}\}$$

such that the maximum power from any antenna of the N plurality of antennas is $P_{max}/N$ and the total power emitted from the N plurality of antennas combined is between $P_{max}/M$ and $P_{max}$.

10. The device of claim 7, wherein if N>M, then d=1, such that the power emitted by antenna i for i=1 to N is $(P_{max}/N) \cdot (VV^H)_{ii}$, and the total power emitted from the N plurality of antennas combined is $P_{max}/M$.

11. The device of claim 7, wherein each of the L signals is baseband modulated using a multi-carrier modulation process, and the baseband signal processor multiplies the vector s with a transmit matrix A(k) at each of a plurality of sub-carriers k.

12. A radio communication system for simultaneously transmitting signals over a channel between N transmit antennas and M receive antennas, the radio communication system comprising:

a. a first device comprising:
   i. N plurality of antennas;
   ii. N plurality of radio transmitters each coupled to a corresponding one of the plurality of antennas; and
   iii. a baseband signal processor coupled to the N plurality of radio transmitters to process a vector s representing L signals $[s_1 \ldots s_L]$ with a transmit matrix A that is computed to maximize capacity of the channel by multiplying the vector s with the transmit matrix A, wherein the transmit matrix A is equal to VD, where V is an eigenvector matrix for $H^H H$, H is the channel response from the first device to the second device, $D=\mathrm{diag}(d_1, \ldots, d_L)$ and $|d_p|^2$ is the transmit power for p=1 to L; and to transmit according to a power constraint for each individual transmit antenna path, wherein if $N \leq M$, then $D=I \cdot \mathrm{sqrt}(P_{max}/N)$, with I as an identity matrix, such that the power transmitted by each of the N plurality of antennas is the same and equal to $P_{max}/N$; and if N>M, then $D=\mathrm{sqrt}(d \cdot P_{max}/N) \cdot I$, such that the power transmitted by antenna i for i=1 to N is $(d \cdot P_{max}/N) \cdot (VV^H)_{ii}$, and $d_p = d$ for p=1 to L;
b. the second device comprising:
   i. M plurality of antennas;
   ii. M plurality of radio receivers each coupled to a corresponding one of the plurality of antennas; and
   iii. a baseband signal processor coupled to the M plurality of radio receivers to process signals output by the plurality of radio receivers with receive weights and combining the resulting signals to recover the L signals $[s_1 \ldots s_L]$.

13. The system of claim 12, wherein if N>M, then d=1/z and $$z = \max_i \{(VV^H)_{ii}\}$$

such that the maximum power from any antenna of the N plurality of antennas is $P_{max}/N$ and the total power emitted from the N plurality of antennas combined is between $P_{max}/M$ and $P_{max}$.

14. The system of claim 12, wherein if N>M, then d=1, such that the power emitted by antenna i for i=1 to N is $(P_{max}/N) \cdot (VV^H)_{ii}$, and the total power emitted from the N plurality of antennas combined is $P_{max}/M$.

15. The system of claim 12, wherein each of the L signals is baseband modulated using a multi-carrier modulation process, and the baseband signal processor multiplies the vector s with a transmit matrix A(k) at each of a plurality of sub-carriers k.

* * * * *

UNITED STATES PATENT AND TRADEMARK OFFICE
CERTIFICATE OF CORRECTION

PATENT NO.         : 7,194,237 B2
APPLICATION NO. : 10/627537
DATED                 : March 20, 2007
INVENTOR(S)       : Sugar et al.

It is certified that error appears in the above-identified patent and that said Letters Patent is hereby corrected as shown below:

At FIG. 1, input to Device 200, delete "210(N)" and insert therefore --210(M)--.

At column 3, line 2, before the words "is the", delete "|dp|2" and insert therefor --|dp|2--.

At column 3, lines 6 & 7, after the word "computes", delete "c=AHHHHAS+AHHHn=DHDAs+DHVHHHn." and insert -- c=AHHHHAs+AHHHn=DHDAs+DHVHHHn.--.

Signed and Sealed this

Twenty-fifth Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,194,237 B2
APPLICATION NO. : 10/627537
DATED : March 20, 2007
INVENTOR(S) : Sugar et al.

It is certified that error appears in the above-identified patent and that said Letters Patent is hereby corrected as shown below:

At FIG. 1, input to Device 200, delete "210(N)" and insert therefore --210(M)--.

At column 3, line 2, before the words "is the", delete "|dp|2" and insert therefor --$|dp|^{2-}$--.

At column 3, lines 6 & 7, after the word "computes", delete "c=AHHHHAS+AHHHn=DHDAs+DHVHHHn." and insert --c=AHHHHAs+AHHHn=DHDAs+DHVHHHn.--.

This certificate supersedes the Certificate of Correction issued December 25, 2007.

Signed and Sealed this

Twenty-second Day of July, 2008

JON W. DUDAS
*Director of the United States Patent and Trademark Office*